No. 720,595. PATENTED FEB. 17, 1903.
J. C. F. MALTHANER.
RINGING GENERATOR.
APPLICATION FILED SEPT. 13, 1902.
NO MODEL.
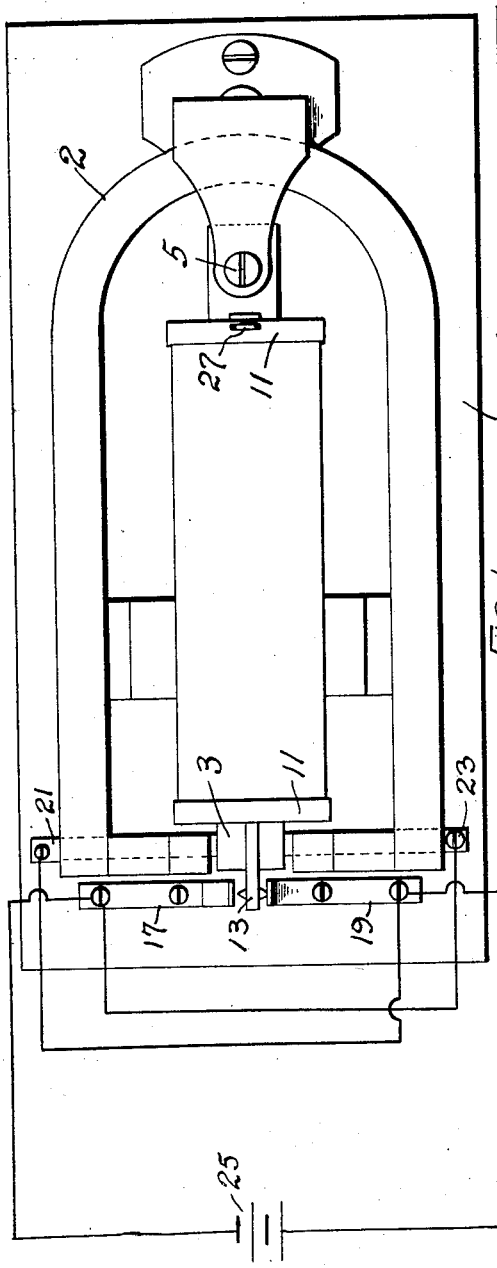
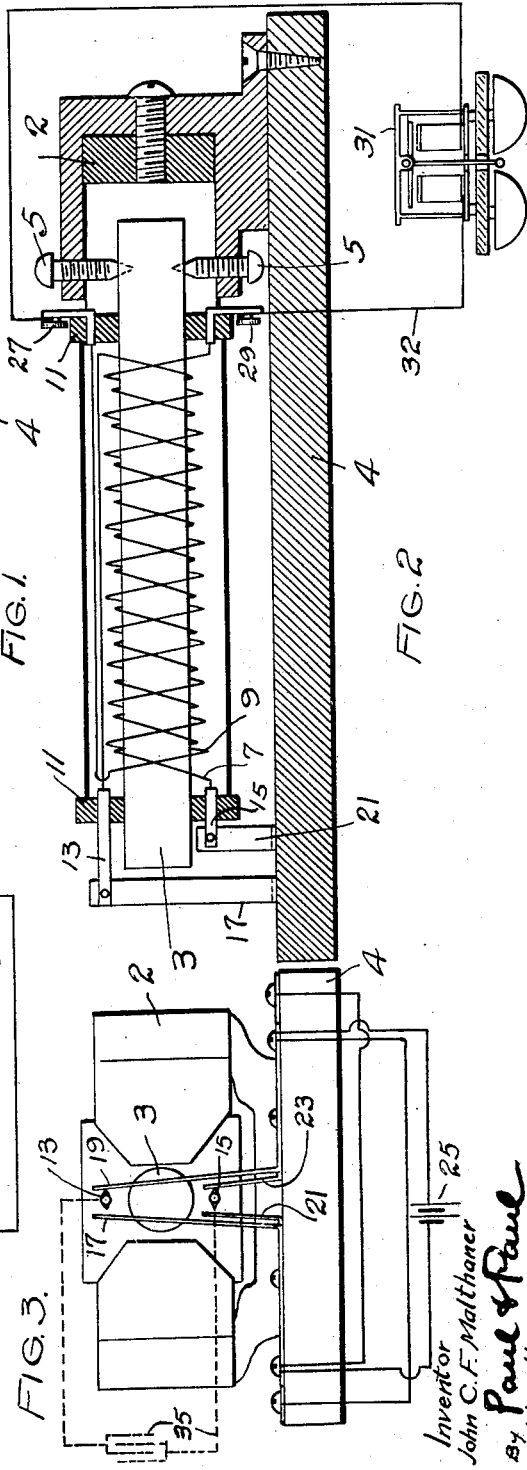
Witnesses
E. G. Strand
O. G. Hanson
Inventor
John C. F. Malthaner
By his attorneys
Paul & Paul

UNITED STATES PATENT OFFICE.

JOHN C. F. MALTHANER, OF MINNEAPOLIS, MINNESOTA, ASSIGNOR OF ONE-HALF TO J. O. THERIEN, OF MINNEAPOLIS, MINNESOTA.

RINGING-GENERATOR.

SPECIFICATION forming part of Letters Patent No. 720,595, dated February 17, 1903.

Application filed September 13, 1902. Serial No. 123,267. (No model.)

*To all whom it may concern:*

Be it known that I, JOHN C. F. MALTHANER, of Minneapolis, Hennepin county, Minnesota, have invented certain Improvements in Ringing-Generators, of which the following is a specification.

This invention relates to improvements in magneto-electric generators, designed especially for use in connection with telephone systems for ringing the call-bells employed therein; and the invention consists generally in an oscillating core having two windings thereon, one for the primary circuit and the other for the secondary circuit, and means for reversing the polarity of the core, whereby with a primary circuit of low voltage I am enabled to secure, by means of the oscillating core, a secondary alternating current of high potential.

The invention consists, further, in the constructions and combinations hereinafter described, and particularly pointed out in the claims.

In the accompanying drawings, forming part of this specification, Figure 1 is a plan view of a ringing-generator embodying my invention. Fig. 2 is a vertical section of the same. Fig. 3 is an end elevation.

In the drawings, 2 represents a permanent magnet secured in a fixed position upon a suitable base 4 by any suitable means.

3 represents a soft-iron core mounted at one end upon pivot-screws 5 and capable of oscillating in the plane of the magnet 2. Upon the soft-iron core 3 are two windings of insulated wire 7 and 9, the inner winding constituting the primary circuit and the other winding the secondary circuit. The bobbin heads or ends 11 are arranged upon the core 3 and serve to retain the windings 7 and 9 in position. The core 3 and the ends 11 constitute a bobbin for holding the wires of the primary and secondary circuits. Secured upon the bobbin are the contact-springs 13 and 15, and to these springs the ends of the wires constituting the primary winding of the bobbin are connected. (See Fig. 1.)

Secured upon the base 4 of the device are the contact-springs 17, 19, 21, and 23, (see Figs. 1 and 3,) the springs 17 and 23 being connected to source of current of one polarity or to one pole of battery 25, and the springs 21 and 19 being connected to source of current of opposite polarity or to other pole of battery 25. The secondary winding 9 upon the bobbin in which the secondary circuit is secured is connected to the binding-posts 27 and 29.

31 represents an ordinary alternating-current bell located at any convenient point and connected to the binding-posts 27 and 29 by a suitable conductor 32. The bell is thus located in the secondary circuit. A suitable condenser 35 may be bridged across the primary winding to lessen the sparking at the contact-points.

Operation: The current from the battery 25 passing through the springs 19 and 23 and around the soft-iron core through the primary winding 7 changes the polarity of the core 3, which is then drawn to the opposite side of the permanent magnet 2. This breaks the circuit through the springs 19 and 23 and closes it through the springs 17 and 21. This reverses the primary current and again changes the polarity of the core, which is drawn to the other side, breaking the circuit through springs 17 and 21 and again closing it through springs 19 and 23. A rapid oscillation of the bobbin is thereby secured and simultaneous reversals of the current through the primary winding of the bobbin. This generates an alternating current in the secondary winding. By this means with a primary current of low voltage a secondary current of high potential is secured. Two cells of battery are all that need be used for the primary circuit. By this means I am enabled to secure in a single coil the step up from the low voltage of the primary circuit to the high potential required in the secondary circuit. I do not limit myself to any particular ratio between the primary and secondary windings, as the same may be varied as may be necessary to secure the voltage desired in the secondary circuit.

I claim as my invention—

1. The combination, in a generator of the class described, with the contact-springs and the source of electric current, of the oscillating bobbin provided with the primary and secondary windings, substantially as described.

2. The combination, in a generator of the class described, with the pivoted core provided with the primary and secondary windings, of the contact-springs and a source of electric current connected to said contact-springs, substantially as described.

3. The combination, in a generator of the class described, with the permanent magnet, of the pivoted core provided with the primary and secondary windings, the contact-springs and a source of electric current connected to said contact-springs, substantially as described.

4. The combination, with the permanent magnet 2, of the pivoted soft-iron core 3 provided with the primary and secondary windings 7 and 9, the contact-springs 13 and 15 to which the primary winding is connected, and the contact-springs 17, 19, 21 and 23 connected to a source of current, substantially as described.

In witness whereof I have hereunto set my hand this 10th day of September, 1902.

JOHN C. F. MALTHANER.

In presence of—
A. C. PAUL,
C. G. HANSON.